United States Patent [19]

Herron

[11] Patent Number: 5,229,050

[45] Date of Patent: Jul. 20, 1993

[54] METHOD OF MAKING MARBLE-LIKE PORCELAIN FIGURINES

[76] Inventor: Rodney M. Herron, 3480 Orchard Ave., Finleyville, Pa. 15332

[21] Appl. No.: 831,548

[22] Filed: Feb. 4, 1992

[51] Int. Cl.⁵ ............................................. C04B 41/86
[52] U.S. Cl. ........................................ 264/62; 264/245
[58] Field of Search ................................. 264/62, 245

[56] References Cited

U.S. PATENT DOCUMENTS

| | | | |
|---|---|---|---|
| 97,004 | 11/1869 | Volckmann | 264/60 |
| 1,657,997 | 1/1928 | Hyten | 264/73 |
| 3,812,229 | 5/1974 | Anderson | 264/60 |
| 3,979,542 | 9/1976 | Perantoni et al. | 428/204 |
| 4,320,078 | 3/1982 | Allen et al. | 264/73 |

FOREIGN PATENT DOCUMENTS

| | | | |
|---|---|---|---|
| 15440 | 3/1905 | United Kingdom | 264/62 |
| 298018 | 10/1928 | United Kingdom | 264/245 |

OTHER PUBLICATIONS

Whiteneres, George Jackson, Maclaren & Sons, London, 1969 pp. 72, 76, 77, 82, 84, 106, 123-125, 128, 129, 142, 143.

Primary Examiner—James Derrington
Attorney, Agent, or Firm—Wigman, Cohen, Leitner & Myers

[57] ABSTRACT

A molding method of making a porcelain figurine having marble-like or variegated characteristics on its surface and throughout its thickness is disclosed.

4 Claims, 3 Drawing Sheets

```
PREPARING THE SLIPS
        |
MIXING THE SLIPS
        |
MOLDING THE SLIPS
        |
DRYING TO GREENWARE
        |
CLEANING THE GREENWARE
        |
FIRING TO A SOFT BISQUE STATE
        |
WASHING THE SOFT BISQUE
        |
GLAZING
        |
FIRING TO PORCELAINIZE
        |
ACCENTING
        |
FIRING
        |
FINAL PRODUCT
```

1

METHOD OF MAKING MARBLE-LIKE PORCELAIN FIGURINES

BACKGROUND OF THE INVENTION

1. Field of the Invention

This invention relates to porcelain figurines, and more particularly to porcelain figurines which have the appearance of being made of marble.

Statuettes and figurines made of marble, while beautiful and sturdy, are heavy and very expensive due to the high price of the marble as well as the cost of having the piece hand sculpted.

A need has therefore arisen for figurines which, while appearing to have been hand sculpted from marble, in fact are made of porcelain using conventional molds. Objects so constructed are significantly less expensive and lighter in weight than those made from solid marble but yet possess exceptional beauty.

2. Description of the Prior Art

U.S. Pat. No. 3,979,542 to Perantoni et al. discloses a method of producing a marble-like porcelain enamel surface. A key disadvantage of objects made by this method is that only the surface of the object is marbleized; the remainder of the object remains non-marbleized. This gives the object a cheap, painted appearance, and fails to meet consumer demand for authentic-looking, marble-like figurines. Additionally, as with any surface coating, it is vulnerable to wearing off, being scraped, chipped, etc. Another disadvantage with marbleizing only the surface of the object is the fact the design can be easily replicated. This characteristic is unpopular to many consumers who desire art objects which are individual, original, and unique, rather than those which appear to have been mass produced.

Other U.S. patents uncovered disclose a process for making marbleized pottery wherein a basic cement slurry and a colored slurry are poured into a rotating mold such that each stream of slurry maintains its color integrity (U.S. Pat. No. 4,320,078 to Allen et al); and a process for making china or ceramic sanitary wear having a marbleized appearance (U.S. Pat. No. 3,812,229 to Anderson). Other U.S. patents which represent the state of the art are U.S. Pat. No. 97,004 to Volckmann; and U.S. Pat. No. 1,657,997 to Hyten. None however, describe or suggest the process according to this invention.

SUMMARY AND OBJECTS OF THE INVENTION

In view of the foregoing, it should be apparent that a need still exists in the art for a genuine-looking marbleized porcelain figurine wherein the marbleization cannot be removed.

Accordingly, it is a primary object of this invention to provide a porcelain figurine which is marbleized throughout its entire thickness.

Another object of this invention is to provide a marbleized porcelain figurine which can be made inexpensively, using one or more colored porcelain slips and conventional molds and kilns.

Yet another object of this invention is to provide a marbleized porcelain figurine which is esthetically pleasing.

Still another object of the invention is to provide a marbleized porcelain figurine, wherein the marbleization is permanent so as not to rub off or be susceptible to chipping.

Yet another object of this invention is to provide a marbleized porcelain figurine having a one-of-a kind appearance incapable of duplication.

Still another object of this invention is to provide a marbleized porcelain figurine which is lightweight and yet resembles much heavier sculptured marble.

Generally, in the method of the present invention one or more different colors of porcelain slip are introduced into a mold and mixed either prior to pouring or during the pouring into a mold thereby producing a marbleized effect throughout the entire thickness of the object rather than merely on the surface thereof. Many different effects can be achieved by controlling the manner in which mixing is carried out. The invention is not limited to the number of colored slips which can be used at one time. As little as one and up to about 10 different colored slips have to be used with varying proportions. After molding, the piece is removed from the mold, dried, cleaned, fired to soft bisque state, washed, glazed, fired to porcelain state, accented and fired again to provide a finished figurine having unique aesthetic qualities.

Important features of the present invention reside in the cleaning and washing steps after the piece is dried to the greenware state and fired to the soft bisque state, respectively. This results in the removal of fine particles, which, if not removed, causes undesirable surface imperfections in the final product.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE PREFERRED EMBODIMENTS

Figure 1:
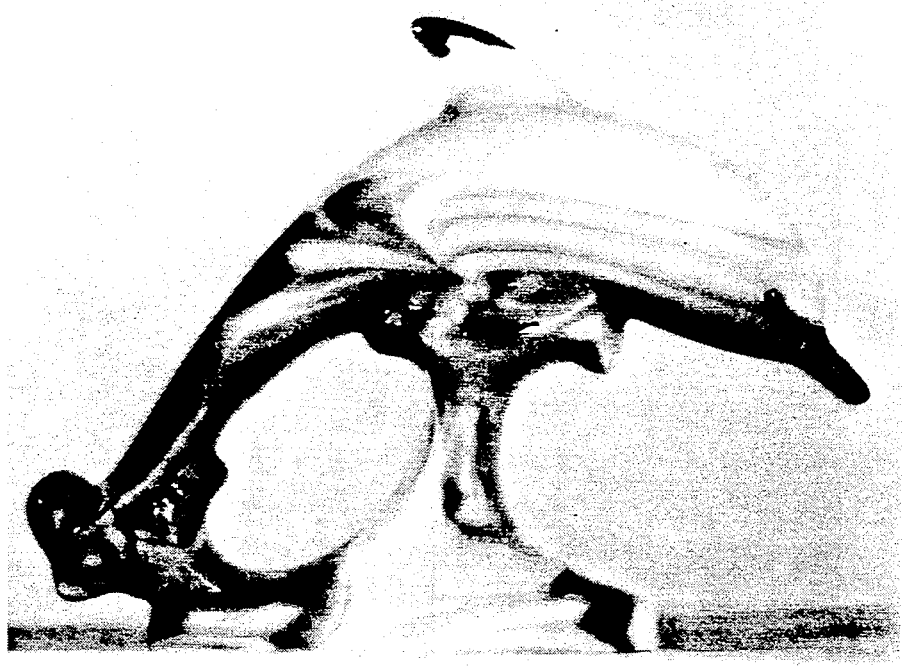
FIG. 1 is a black and white photograph of a figurine made according to the method of the present invention, showing the ornamental effect thereof.

Referring now in detail to the drawings wherein like parts are designated by like reference numerals throughout, there is shown in FIG. 1 a black and white photographic reproduction of a dolphin figurine 10 made according to the method of the present invention. It is a key feature of the present invention that figurine 10 appears to the observer to have been sculpted from solid marble. Nevertheless, as explained in detail below, figurine 10 is constructed of a significantly lighter and less expensive material, namely, porcelain. As shown in FIG. 1, the dolphin 10 is integrally formed atop a pedestal 12. A marble-like effect 14, 16 is achieved by using contrasting colored slips which are partially blended either prior to or during the casting operation, as will be described in greater detail hereinafter.

Although the embodiment shown is a figurine of a dolphin, the method of the instant invention can be used to create statuettes and figurines of any shape or size such as animals, religious figures and symbols, busts of individuals, etc.

Generally, the wall thickness of the hollow porcelain figurines of this invention preferably range from about 40-70 mils. The figurines vary in size from about 1" to 10" in height, from about 1" to 10" in length and from about 1" to 5" in width.

Figure 3:
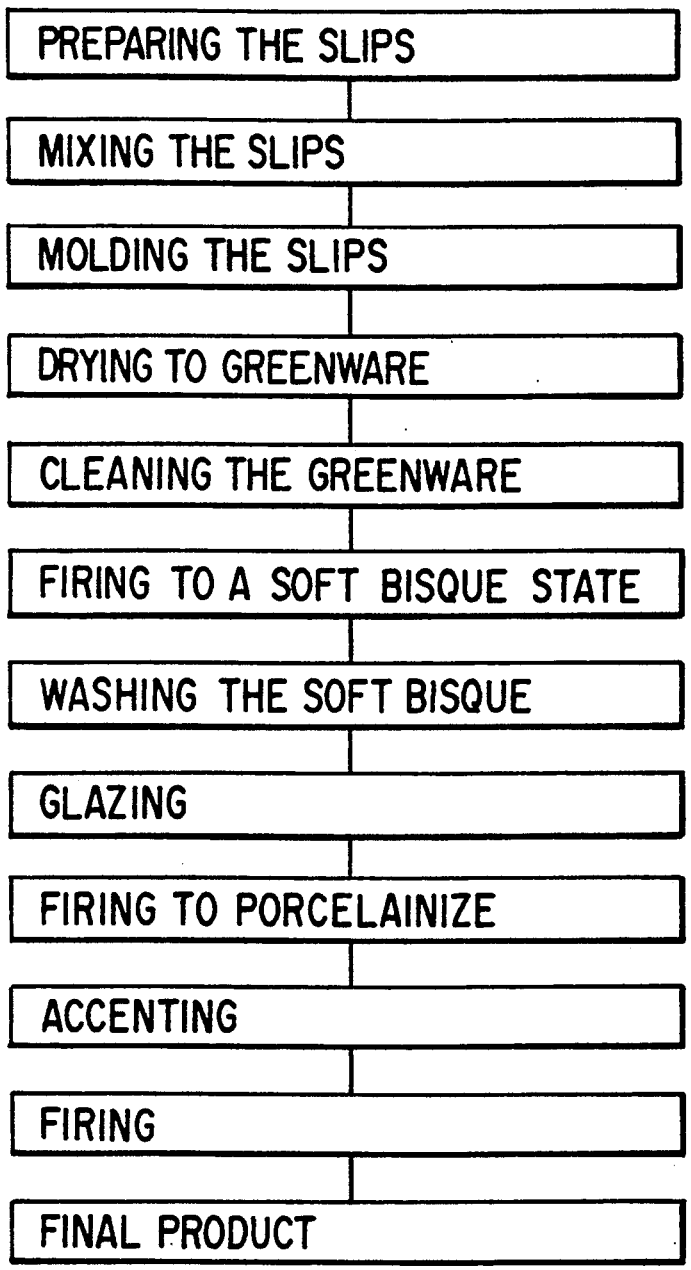
FIG. 3 is a block diagram showing the basic steps used in accordance with the method of the present invention.

Referring now to the block diagram of FIG. 3, one preferred method of producing the dophin figurine 10 will be described.

A. Preparing the Slips

Approximately one gallon of a conventional liquid porcelain slip of a first color was emptied into a container and mixed using a stirring tool to a consistency which is suitable for pouring. The stirring tool, preferably made of wood, should not be coated with paint, shellac or other coating capable of flaking off or dissolving in the slip. The mixed slip was then strained using a conventional household strainer.

A porcelain slip of a second color was then similarly prepared and strained in the manner detailed above.

B. Mixing of the Slips

Approximately twenty-four ounces of the first colored slip was poured into a glass mixing and pouring dish, the dimensions of which are approximately 33 cm×25 cm×5 cm. Naturally, other suitable mixing containers could be used. Approximately eight ounces of the second colored slip was then poured into the center of the dish and mixed or blended in part with the first colored slip using an appropriate stirring tool, preferably made of wood. Stirring was carried out in random directions such that the finished piece produced was variegated and distinctive. For example, the tool can be placed in the center of the second colored slip and moved to the sides of the dish in a plurality of directions.

C. Molding the Slips

After being stirred, the contents of the dish were poured into a ceramic type mold forming the dolphin article. Examples of the types of molds which may be employed are those made by Indiana Hobby of Chandlier, Ind., Scioto Ceramic Products, of Grave City, Ohio, Gare of Haverhill, Mass., Kimple Mold Corp. of Goddard, Kans., and Duncan Enterprises of Fresno, Calif. Alternately, the colored slips can be simultaneously poured directly into the mold from separate containers and mixed "on the fly". The resulting mixed slip was left in the mold from one to four minutes to achieve the desired wall thickness.

D. Drying to Greenware State

The mold was then placed on a drying rack with the pouring hole face down for between twenty minutes and one hour depending on the room temperature and humidity. The mold was then opened for about ten minutes and the molded piece was allowed to dry in place to yield greenware. After the greenware was removed from the mold, it was left to dry for several days. When dry, the greenware piece was cleaned with conventional cleaning tools and nylon. Seams and other imperfections were removed by sanding, and then brushed to remove excess dust particles.

E. Firing to the Soft Bisque State Washing

The greenware piece was then placed in a kiln at about room temperature and fired to an elevated temperature, preferably in excess of 1800° F. and more preferably between about 1880° F. to 1890° F. The kiln temperature was raised at a rate of about 500°/hr to prevent thermal shock to the molded piece. Although a firing temperature of about 1888° F. yields particularly good results, the temperature is not critical. After reaching the desired temperature, the kiln is cooled to room temperature at about 500°/hr. The firing temperature should be high enough to yield a soft bisque piece, which is sufficiently strong to withstand handling but not high enough to achieve a porcelainized state. In the soft bisque state the piece does not display the striking marble-like effect and is not yet in a porcelainized state. The soft bisque piece, however, allows for the removal of all dust particles prior to glazing and porcelainizing. The soft bisque piece is removed from the kiln where it is washed with water and allowed to dry thoroughly.

F. Glazing and Firing to Porcelainize

To give the piece a shine so as to more closely resemble marble, it is preferably coated with a clear glaze such as Ceramichrome NG1OO Clear Glaze. After the glaze dries, the coated soft bisque piece was again placed into the kiln at room temperature and heated to a temperature in excess of 2000° F. to achieve a porcelainized state. At this state the marbeleizing effect is brought out. A firing temperature of between 2190° F. and 2200° F. is preferred and about 2194° F. is most preferred. The kiln temperature is raised at a rate of about 500°/hr to prevent thermal shock. Thereafter, the kiln is allowed to cool to room temperature at the same rate as in heating and the piece is then removed. If the firing temperature is too low the piece does not achieve its porcelain state; if too high, the surface becomes bubbled.

G. Accenting

Figure 2:
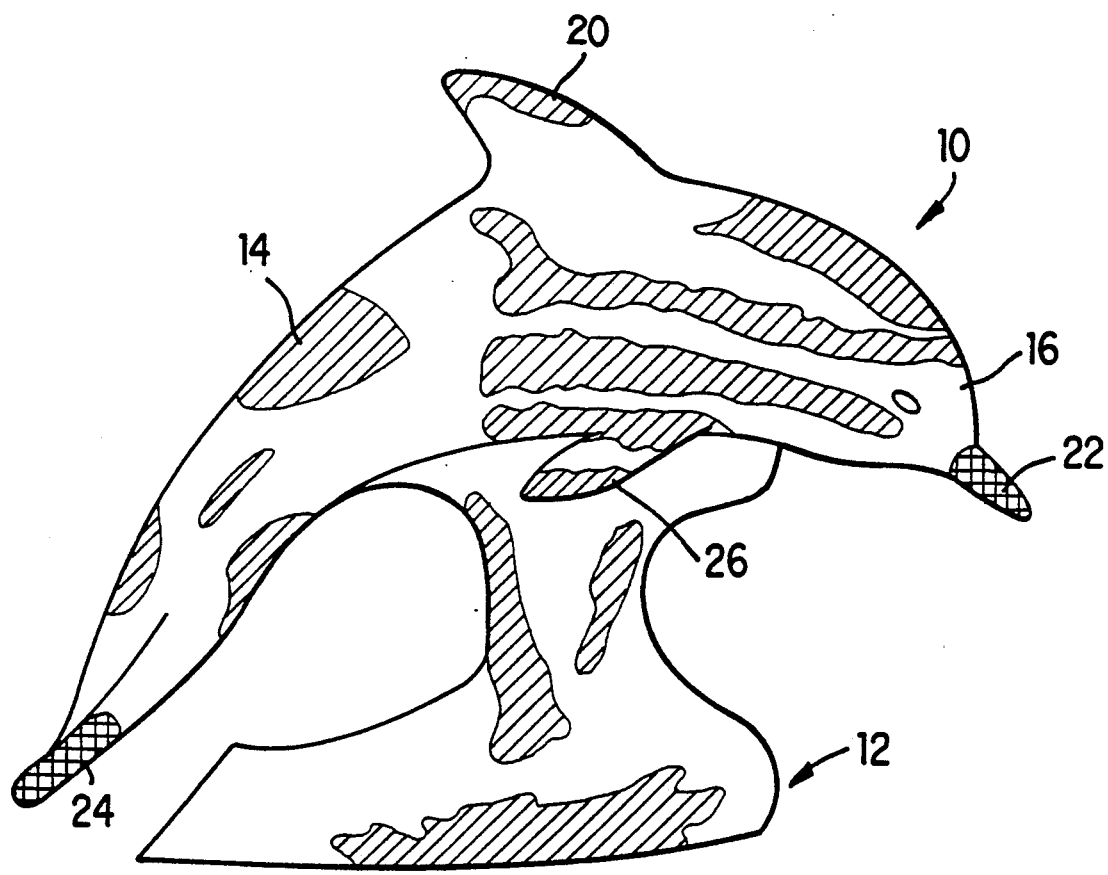
FIG. 2 is a side elevation of a porcelain dolphin figurine made according to the method of the present invention.

The cooled glazed piece was accented with liquid bright gold or China paints such as Dunan OG 801 Bright Gold or American Beauty China Paint. As seen in FIG. 2, the dolphin was accented at selected portions such as the fin 20, the nose 22 and the tail 24. Other figurines such as cats, dogs, owls, teddy bears, etc. would be similarly accented with gold or paint around the eyes, tail and feet.

H. Final Firing

After accenting, the glazed piece is again placed in a kiln at room temperature, fired to a temperature of preferably between 1280° F. and 1290° F., most preferably at 1285° F. A similar heating and cooling rate of 500°/hr was used. After the piece was cooled it was removed from the kiln.

In sum, a figurine produced according to the above method has a one-of-a-kind, unique and attractive marble-like appearance wherein no two pieces look the same. Moreover, the figurine will be marbleized throughout its entire thickness rather than merely on the surface. Any number of colored slips can be used to achieve unique surface designs. For example, colored slips such as white, black, brown, pink, green, and yellow have been used in various combinations with success. Although the invention is preferably used with slips of contrasting color, it is also applicable where only a single color slip is desired thereby yielding a figurine of one color which can be accented.

Although only a preferred embodiment of the invention is specifically illustrated and described herein, it will be appreciated that many modifications and variations of the invention are possible in light of the above teachings and within the purview of the appended claims without departing from the spirit and intended scope of the invention.

What is claimed is:

1. A method of making a hollow marbleized porcelain figurine which is small and light weight comprising the steps of:
   providing a mold having a cavity therein for forming a figurine of a particular shape,
   filling said cavity with at least two porcelain slips of contrasting colors to create a marbleized effect;
   drying said molded shape to form greenware;
   cleaning said greenware;
   firing said greenware to a temperature of about 1800° F. to 1890° F. to a soft bisque state;
   washing said soft bisque;
   glazing said soft bisque;
   firing said glazed soft bisque at an elevated temperature to produce a porcelainized and marbleized figurine;
   cooling said figurine;
   accenting said figurine with decorate paint;
   whereby a light weight porcelain figurine is produced having a marbleized effect throughout the thickness of said figurine.

2. The method of claim 1, wherein said at least two porcelain slips are poured into a container and mixed therein prior to being poured into said mold.

3. The method of claim 1 wherein said greenware is fired at about 1880° F.–1890° F.

4. The method of claim 1 wherein firing said soft bisque is carried out at a temperature range of about 2190° F.–2200° F.

* * * * *